Patented Dec. 28, 1943

2,338,064

UNITED STATES PATENT OFFICE 2,338,064

DERIVATIVES OF 2,4-OXAZOLIDINEDIONE

Roger W. Stoughton, Nashville, Tenn., assignor to Mallinckrodt Chemical Works, St. Louis, Mo., a corporation of Missouri No Drawing. Application February 10, 1940, Serial No. 318,321

3 Claims. (Cl. 260—307)

This invention relates to new derivatives of 2,4-oxazolidinedione, and with regard to certain more specific features to such derivatives which represent substitutions in the 5-position by at least one alkyl radical containing at least three carbon atoms.

Among the several objects of this invention may be noted the provision of new chemical compounds which are 5-substituted derivatives of 2,4-oxazolidinedione, and their alkali and alkaline earth metal salts, useful as hypnotics, sedatives, and narcotics, and the provision of new intermediates for the preparation of these compounds. Other objects will be in part obvious and in part pointed out hereinafter.

The invention accordingly comprises the elements and combinations of elements, the proportions thereof, and features of composition, which will be exemplified in the substances and products hereinafter described, and the scope of the application of which will be indicated in the following claims.

The compounds included in this invention may be represented by the following type formula:

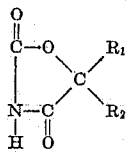

in which $R_1$ is hydrogen or an alkyl radical and $R_2$ is an alkyl radical containing at least three carbon atoms.

Throughout the specification and claims, where the term alkyl appears, it will be understood that cycloalkyl radicals are included.

Example 1

Typical of the compounds included in the present invention is the di-n-propyl derivative of 2,4-oxazolidinedione. This compound may be represented by the following structural formula:

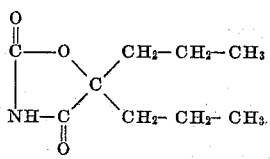

and may be prepared in the following manner:

A mixture of 39 g. (0.2 mol) of ethyl α,α-di-n-propyl-α-hydroxyacetate (prepared, for example, by the hydrolysis and subsequent esterification of the cyanohydrin of di-n-propyl ketone or as described in Example 19, post) with 15 g. (0.25 mol) of dry urea is dissolved in 100 ml. of a 2.5 normal solution of sodium ethylate in absolute alcohol. The mixture is heated under a reflux for from ten to twelve hours, after which the alcohol is distilled off under reduced pressure and the residue dissolved in a minimum amount of cold water. The unreacted ester is then extracted with ether, the extracted aqueous solution is then acidified and an oil separates out. This oil is purified by distillation under reduced pressure, and is recrystallized from petroleum ether. The product, 5,5-di-n-propyl-2,4-oxazolidinedione is obtained as a colorless, crystalline solid, which melts at 42 to 43° C. and boils at 148 to 150° C. under a pressure of 3 mm. of mercury. The yield is 75 to 80% of the theoretical.

5,5-di-n-propyl-2,4-oxazolidinedione is almost insoluble in cold water. It is very slightly soluble in cold petroleum ether, very soluble in warm petroleum ether, easily soluble in alcohol, ether, chloroform and benzene. It behaves as a weak mono-basic acid, and forms alkali and alkaline earth metal salts by reaction with the equivalent amount of alkali or alkaline earth metal hydroxide or carbonate. The sodium salt so obtained is a hygroscopic, glassy solid. It is very soluble in water and alcohol. The calcium salt is a crystalline, non-hygroscopic solid fairly soluble in water and alcohol. It crystallizes from aqueous solution as the mono-hydrate and decomposes without melting between 300 and 400° C.

Example 2

5-n-hexyl-2,4-oxazolidinedione is prepared by substituting for the ester in Example 1, ethyl α-n-hexyl-α-hydroxyacetate. The product so obtained crystallizes in colorless plates from benzene, melts at from 90 to 91° C., and is insoluble in water, petroleum ether and cold benzene. It is easily soluble in alcohol, ether and warm benzene.

Example 3

5-methyl-5-n-butyl-2,4-oxazolidinedione is prepared by substituting for the ester in Example 1, ethyl α-n-butyl-α-methyl-α-hydroxyacetate. The product so obtained is a colorless oil boiling between 148 and 151° C., under 3.5 mm. pressure. It is slightly soluble in water, and easily soluble in alcohol, ether, benzene and petroleum ether.

Example 4

5-methyl-5-n-amyl-2,4-oxazolidinedione is obtianed by substituting for the ester in Example 1, ethyl α-n-amyl-α-methyl-α-hydroxyacetate. The product is obtained as a waxy solid, melting at 25° C. to a colorless oil, which boils at 158 to 160° C. under 4 mm. pressure. It is very slightly soluble in water and easily soluble in alcohol, ether, benzene and petroleum ether.

Example 5

5-methyl-5-n-hexyl-2,4-oxazolidinedione is obtained by substituting for the ester in Example 1, ethyl α-n-hexyl-α-methyl-α-hydroxyacetate. The product obtained crystallizes as a colorless solid from petroleum ether, has a melting point of 46 to 47° C. and boils at from 161 to 163° C. under 5 mm. pressure. It is insoluble in cold water, and cold petroleum ether, but is easily soluble in alcohol, ether, benzene and warm petroleum ether.

Example 6

5-methyl-5-n-heptyl-2,4-oxazolidinedione is obtained by substituting for the ester in Example 1, ethyl α-n-heptyl-α-methyl-α-hydroxyacetate. The product crystallizes from petroleum ether in the form of fine colorless needles, which melt at 32° C. and boil at 154 to 158° C. under 2 mm. pressure. They are insoluble in water and cold petroleum ether, but are soluble in alcohol, ether, benzene and warm petroleum ether.

Example 7

5-ethyl-5-isoamyl-2,4-oxazolidinedione is obtained by substituting for the ester in Example 1, ethyl α-ethyl-α-isoamyl-α-hydroxyacetate. The product is obtained as a colorless oil boiling from 150 to 153° C. under 2.5 mm. pressure. It is insoluble in water, but easily soluble in alcohol, ether, benzene and petroleum ether.

Example 8

5-ethyl-5-cyclohexyl-2,4-oxazolidinedione is obtained by substituting for the ester in Example 1, ethyl α-cyclohexyl-α-ethyl-α-hydroxyacetate. The product crystallizes from dilute methanol as iridescent plates which melt at 100 to 101° C. It is insoluble in water and petroleum ether, but soluble in alcohol, ether and benzene.

Example 9

5,5-di-isopropyl-2,4-oxazolidinedione is obtained by substituting for the ester in Example 1, ethyl α,α-di-isopropyl-α-hydroxyacetate. The product crystallizes as colorless needles from a mixture of benzene and petroleum ether, has a melting point of 86 to 87° C. and boils at 138 to 139° C. under 2.5 mm. pressure. The needles are insoluble in cold water and petroleum ether, but are soluble in alcohol, ether and benzene.

Example 10

5,5-di-n-butyl-2,4-oxazolidinedione is prepared by substituting for the ester in Example 1, ethyl α,α-di-n-butyl-α-hydroxyacetate. The product crystallizes as fine colorless needles from petroleum ether. These needles melt at 68 to 69° C., boil at 165 to 175° C. at 5 mm. pressure, and are insoluble in water and cold petroleum ether but are soluble in alcohol, ether, benzene and warm petroleum ether.

As has been indicated above, the ester which is condensed with urea to prepare the oxazolidinedione compounds described above may be conveniently obtained by the hydrolysis and subsequent esterification of the cyanohydrin of the corresponding dialkylketone. In some instances, however, it may be more convenient to obtain the material for the urea condensation in other manners.

Example 11

Ethyl α-n-butyl-α-methyl-α-hydroxyacetate was prepared as follows: In a one-liter three-necked flask, fitted with a mechanical stirrer and dropping funnel, are placed a solution of 26 g. (0.5 mol) of sodium cyanide (technical cyanegg) in 75 ml. of water, and 50 g. a0.5 mol) of n-butyl methyl ketone. The flask was cooled in an ice bath, stirred vigorously, and 130 ml. of a saturated solution of sodium bisulfite was added to the mixture over a period of one and a half hours. Stirring was continued for a half hour after the addition of the bisulfite had been completed. The cyanohydrin layer was separated and dissolved in 200 ml. of absolute alcohol, to which 5 ml. of water had been added. This mixture was saturated with dry gaseous hydrogen chloride, and refluxed for twenty hours. From time to time the ammonium chloride which separated was filtered off, to prevent bumping. The excess alcohol was then removed by distillation from the steam bath, and the residue poured onto cracked ice. The resulting oil was taken up in ether, washed with a sodium carbonate solution, and distilled. A small amount of free acid was recovered from the carbonate washings. The ethyl ester so obtained had a boiling point of 100 to 101° C. under 25 mm. pressure. The corresponding acid, namely, α-n-butyl-α-methyl-α-hydroxyacetic acid, obtained by hydrolyzing the ester, had a melting point of 33° C. and a boiling point under 5 mm. pressure of 127 to 129° C.

The ester product so obtained may then be converted by the procedure outlined above to 5-methyl-5-n-butyl-2,4-oxazolidinedione, by reaction with urea.

Example 12

Ethyl α-n-amyl-α-methyl-α-hydroxyacetate was prepared by substituting methyl n-amyl ketone for the methyl n-butyl ketone in Example 11. The ester so obtained boils between 112 and 113° C. under 23 mm. pressure. The corresponding acid has a melting point of 44 to 45° C. and a boiling point of 139 to 140° C. under 6 mm. pressure. The ester product may be converted into 5-methyl-5-n-amyl-2,4-oxazodinedione by the method outlined above.

Example 13

Ethyl α-n-hexyl-α-methyl-α-hydroxyacetate is prepared by substituting methyl n-hexyl ketone for the methyl n-butyl ketone in Example 11. The ethyl ester so obtained has a boiling point of from 131 to 133° C. under 35 mm. pressure. The corresponding acid has a melting point of 40–41° C. and the p-toluide of the acid has a melting point of 98 to 99° C. The ester product may be converted to 5-methyl-5-n-hexyl-2,4-oxazolidinedione by the previously-described method.

Example 14

Ethyl α-n-heptyl-α-methyl-α-hydroxyacetate is prepared by substituting methyl n-heptyl ketone for the methyl n-butyl ketone in Example 11. The ethyl ester so obtained has a boiling point of 103 to 104° C. under 3 mm. pressure and of 138 to 140° C. under 20 mm. pressure. The corresponding acid has a melting point of 38 to 39° C. and a boiling point of 140 to 142° C. under 2 mm. pressure. The ester may be converted into 5-methyl-5-n-heptyl-2,4-oxazolidinedione by reaction with urea.

Example 15

Ethyl α-ethyl-α-isoamyl-α-hydroxyacetate is prepared as follows: Into a three-liter, three-necked flask fitted with a mechanical stirrer, reflux condenser and dropping funnel, were placed 9.2 g. of magnesium turnings, 5 ml. of ethyl bromide and 25 ml. of anhydrous ether. A crystal of iodine was added, and after the reaction had started, 250 ml. of ether were added. A mixture of 43 g. of ethyl-α-keto-s-methylcaproate (prepared as described in the following example) and 38 g. of ethyl bromide was then added dropwise through the separatory funnel, at such a rate as to cause the ether to reflux gently. This required about six hours. The flask was then heated by means of a water bath for one hour, and then allowed to stand over night at room temperature. The next morning the reaction mixture was cooled and decomposed by the slow addition of 150 ml. of 6N sulfuric acid, and an equal volume of water. The ethereal layer was separated, washed with sodium carbonate solution, and distilled. The fraction boiling at 105 to 120° C. under 20 mm. pressure was collected. This crude product was stirred with 100 ml. of a saturated sodium bisulfite solution, and allowed to stand for twenty-four hours. At the end of this time, the sodium bisulfite addition product of the unchanged keto ester was removed by filtration, and the hydroxy acid ester taken up in benzene. This was further purified by careful rectification through an efficient fractionating column. This method of purification leaves a little keto acid present, but it can be removed by hydrolyzing the ester, and recrystallizing the acid from petroleum ether or dilute methanol, if desired. The acid melts at 69 to 70° C. and boils without decomposition at 121 to 125° C. under a pressure of 3 mm. The pure ester boils at 114 to 115° C. under a pressure of 20 mm. The ester product so obtained may be reacted with urea to form 5-ethyl-5-isoamyl-2,4-oxazolidinedione.

Example 16

Ethyl α-keto-s-methylcaproate is prepared as follows: In a three-liter, three-necked flask fitted with a mechanical stirrer, reflux condenser and dropping funnel, were placed 146 g. (1 mol) of ethyl oxalate dissolved in 500 ml. of anhydrous ether. The flask was cooled in an ice-salt bath, the stirrer started, and one molecular equivalent of isoamyl magnesium bromide prepared from 27 g. of magnesium and 151 g. of isoamyl bromide in 400 ml. of dry ether was added over a period of five hours. During this time the temperature was maintained between $-5°$ and $-10°$ C. After the addition of the Grignard reagent was completed, the mixture was stirred for two hours longer and allowed to stand over night at room temperature. The flask was again cooled and the reaction mixture decomposed by slowly adding 300 ml. of 6N sulfuric acid, with vigorous stirring. The ether layer was separated, washed with a sodium carbonate solution, and distilled through an efficient fractionating column. The boiling point of the ester was 109 to 110° C. under 20 mm. pressure. The corresponding semicarbazone had a melting point of 160 to 161° C.

Example 17

Ethyl α-ethyl-α-cyclohexyl-α-hydroxyacetate is prepared from ethyl magnesium bromide and ethyl cyclohexylglyoxalate, using the procedure described for the preparation of ethyl α-ethyl-α-isoamyl-α-hydroxyacetate described above. The boiling point of the ester so obtained is 129 to 130° C. under 20 mm. pressure. The corresponding acid has a melting point of 136 to 137° C. The ester may be converted into 5-ethyl-5-cyclohexyl-2,4-oxazolidinedione by reaction with urea.

Example 18

Ethyl cyclohexylglyoxalate is prepared from cyclohexyl magnesium bromide and ethyl oxalate, by using the procedure described for the preparation of ethyl-α-keto-s-methylcaproate. The ester obtained has a boiling point of 132 to 134° C. under 20 mm. pressure. The semicarbazone has a melting point of 153 to 154° C.

Example 19

Ethyl α,α-di-n-propyl-α-hydroxyacetate may be prepared as follows: Into a three-liter, three-necked flask, fitted with a mechanical stirrer, reflux condenser, and dropping funnel, were placed 35 g. of magnesium turnings, 10 ml. of n-propyl bromide and 10 ml. of anhydrous ether. A crystal of iodine was added and after the reaction had started, 500 ml. of ether were added. A mixture of 190 g. of n-propyl bromide and 95 g. of ethyl oxalate was then added dropwise through the funnel, at such a rate as to cause the ether to reflux gently by the heat of the reaction. This required four hours. The flask was heated by means of a water bath, for one hour and allowed to stand over night at room temperature. The next morning the reaction mixture was cooled and decomposed, by the slow addition of 250 ml. of 6N sulfuric acid, followed by an equal volume of water. The ethereal layer was separated, washed with sodium carbonate solution, and purified by careful rectification through an efficient fractionating column. The ester product so obtained had a boiling point of 113 to 114° C. under 30 mm. pressure. The free acid which corresponds, namely, the α,α-di-n-propyl-α-hydroxyacetic acid, melts at 80 to 81° C. The ester obtained in this way may be converted as described in Example 1, to 5,5-di-n-propyl-2,4-oxazoldinedione, through reaction with urea.

Example 20

Ethyl α,α-di-isopropyl-α-hydroxyacetate is prepared from isopropyl magnesium bromide and ethyl oxalate by the same method used in Example 19 to prepare the n-propyl derivative. The ester obtained has a boiling point of 71 to 73° C. under 5 mm. pressure. The corresponding free acid melts at 114 to 115° C. The ester product may, if desired, be converted into 5,5-di-isopropyl-2,4-oxazolidinedione as outlined above.

Example 21

Ethyl α,α-di-n-butyl-α-hydroxyacetate is prepared in a similar manner, by substituting n-butyl magnesium bromide for the n-propyl magnesium bromide in Example 19. The ethyl ester so obtained has a boiling point of 116 to 117° C. under 11 mm. pressure. The corresponding free acid melts at 87 to 88° C. The ester so obtained may then be reacted with urea to form 5,5-di-n-butyl-2,4-oxazolidinedione.

All of the oxazolidinedione compounds described above behave as mono-basic acids, and form salts with alkali and alkaline earth metal hydroxides or carbonates. These salts may be conveniently prepared merely by reacting an equivalent of the alkali or alkaline earth metal hydroxide or carbonate with the oxazolidinedione.

The 5-substituted 2,4-oxazolidinedione compounds prepared in accordance with the present invention have especially valuable hypnotic, sedative and narcotic properties. Moreover, it has been found that the efficient dose for their hypnotic or sedative effect is far less than a lethally toxic dose. These products may be used in any of the forms usually employed, for example, their solutions may be administered orally or by subcutaneous or intramuscular injection.

Attention is directed to my copending applications, S. N. 382,582, filed March 10, 1941; S. N. 383,163, filed March 13, 1941; S. N. 426,783, filed January 14, 1942; S. N. 426,784, filed January 14, 1942; and S. N. 477,631, filed March 1, 1943.

In view of the above, it will be seen that the several objects of the invention are achieved and other advantageous results attained.

As many changes could be made in the above substances and products without departing from the scope of the invention, it is intended that all matter contained in the above description shall be interpreted as illustrative and not in a limiting sense.

What is claimed is:

1. The compound 5,5-di-n-propyl-2,4-oxazolidinedione prepared for use as a therapeutic.

2. The alkali and alkaline earth metal salts of 5,5-di-n-propyl-2,4-oxazolidinedione, said salts being prepared for use as therapeutics.

3. A substance selected from the group consisting of 5,5-di-n-propyl-2,4-oxazolidinedione, and alkali and alkaline earth metal salts of said compound, said compound and salts being prepared for use as therapeutics.

ROGER W. STOUGHTON.